(12) United States Patent
Yoshiyasu

(10) Patent No.: US 12,479,980 B2
(45) Date of Patent: Nov. 25, 2025

(54) RUBBER COMPOSITION AND TIRE

(71) Applicant: SUMITOMO RUBBER INDUSTRIES, LTD., Hyogo (JP)

(72) Inventor: Hayato Yoshiyasu, Hyogo (JP)

(73) Assignee: SUMITOMO RUBBER INDUSTRIES, LTD., Hyogo (JP)

( * ) Notice: Subject to any disclaimer, the term of this patent is extended or adjusted under 35 U.S.C. 154(b) by 635 days.

(21) Appl. No.: 17/775,655

(22) PCT Filed: Oct. 19, 2020

(86) PCT No.: PCT/JP2020/039278
§ 371 (c)(1),
(2) Date: May 10, 2022

(87) PCT Pub. No.: WO2021/095448
PCT Pub. Date: May 20, 2021

(65) Prior Publication Data
US 2023/0002592 A1    Jan. 5, 2023

(30) Foreign Application Priority Data
Nov. 11, 2019    (JP) .................................. 2019-203964

(51) Int. Cl.
*C08L 7/00*         (2006.01)
*C08L 9/00*         (2006.01)

(52) U.S. Cl.
CPC .. *C08L 7/00* (2013.01); *C08L 9/00* (2013.01)

(58) Field of Classification Search
CPC .... C08L 7/00; C08L 9/00; C08K 3/34; C08K 2201/003; C08K 2201/004; B60C 1/00
See application file for complete search history.

(56) References Cited

U.S. PATENT DOCUMENTS

| | | | |
|---|---|---|---|
| 5,196,270 A | 3/1993 | Kitagawa et al. | |
| 2004/0035514 A1 | 2/2004 | Kikuchi et al. | |
| 2004/0035515 A1 | 2/2004 | Tsumori et al. | |
| 2005/0101738 A1 | 5/2005 | Shimojo et al. | |
| 2008/0115871 A1 | 5/2008 | Sandstrom et al. | |
| 2010/0056685 A1 | 3/2010 | Hattori et al. | |
| 2013/0319589 A1 | 12/2013 | Sato | |
| 2014/0083588 A1 | 3/2014 | Nahmias Nanni et al. | |
| 2014/0196825 A1 | 7/2014 | Nahmias Nanni et al. | |
| 2018/0134079 A1 | 5/2018 | Miyazaki | |
| 2018/0264884 A1* | 9/2018 | Sato .......................... | C08J 3/22 |

FOREIGN PATENT DOCUMENTS

| | | | |
|---|---|---|---|
| CN | 101181859 A | 5/2008 | |
| CN | 102838790 A | 12/2012 | |
| CN | 103596773 A | 2/2014 | |
| CN | 106085310 A | 11/2016 | |
| CN | 107652570 A | 2/2018 | |
| DE | 10-2013210165 A1 | 12/2013 | |
| EP | 1097825 A1 | 5/2001 | |
| EP | 2193036 A1 | 6/2010 | |
| EP | 2202269 A1 | 6/2010 | |
| EP | 3 943 316 A1 | 1/2022 | |
| JP | 11-246707 A | 9/1999 | |
| JP | 2002-309053 A | 10/2002 | |
| JP | 2003-128844 A | 5/2003 | |
| JP | 2004-034744 A | 2/2004 | |
| JP | 2007-161818 A | 6/2007 | |
| JP | 2007-284536 A | 11/2007 | |
| JP | 2009-143981 A | 7/2009 | |
| JP | 2009-269951 A | 11/2009 | |
| JP | 2010-013540 A | 1/2010 | |
| JP | 2010-058563 A | 3/2010 | |
| JP | 2011-037979 A | 2/2011 | |
| JP | 2012-087188 A | 5/2012 | |
| JP | 2012-144619 A | 8/2012 | |
| JP | 2013-029421 A | 12/2013 | |
| JP | 5691463 B2 | 4/2015 | |
| JP | 2015-189797 A | 11/2015 | |
| JP | 6050433 B1 | 12/2016 | |
| JP | 2017-002153 A | 1/2017 | |
| JP | 2018-065887 A | 4/2018 | |
| JP | 2020-007429 A | 1/2020 | |
| JP | 2020-152744 A | 9/2020 | |
| KR | 2012-0140606 A | 12/2012 | |
| WO | 2009/039889 A1 | 4/2009 | |
| WO | 2012/164433 A1 | 12/2012 | |
| WO | 2012/164436 A1 | 12/2012 | |
| WO | WO-2016174628 A1 * | 11/2016 | ............... B60C 1/00 |
| WO | 2020/121788 A1 | 6/2020 | |
| WO | 2020/189328 A1 | 9/2020 | |

OTHER PUBLICATIONS

Aslett Rubber, Inc., Carbon Black Characteristics Chart (Year: 2024).*
N550 Data Sheet (Year: 2025).*
Office Action issued in JP Patent Application 2021-555960, Aug. 27, 27, 2024, translation.
Office Action issued in CN Patent Application No. 202080073574.5, Sep. 19, 2023, translation.
Xiangyan, Rubber Additives Manual, Rubber Institute, Chemical Industry and Engineering Society of China, Chemical Industry Press, (2004) pp. 408-418, translation.
EESR issued in EP Patent Application No. 20888238.1, Oct. 11, 2022.
ISR issued in International Patent Application No. PCT/JP2020/039278, Dec. 22, 2020, translation.
IPRP issued in International Patent Application No. PCT/JP2020/039278, May 17, 2022, translation.
Decision to Grant a Patent issued in CN Patent Application 202080073574.5, Dec. 4, 2024, translation.
Office Action issued in CN Patent Application 202080073574.5, Dec. 4, 2024, translation.

* cited by examiner

*Primary Examiner* — Angela C Scott
(74) *Attorney, Agent, or Firm* — GREENBLUM & BERNSTEIN, P.L.C.

(57) ABSTRACT

A rubber composition that includes a rubber component, an inorganic fiber material, and a coupling agent. The inorganic fiber material is one or more inorganic fiber materials selected from the group consisting of a magnesium sulfate fiber, a calcium silicate fiber, a potassium titanate fiber, an aluminum borate fiber, and a glass fiber.

8 Claims, No Drawings

RUBBER COMPOSITION AND TIRE

TECHNICAL FIELD

The present invention relates to a rubber composition comprising an inorganic fiber material and a tire having an internal member formed of the rubber composition.

BACKGROUND ART

A technique of giving anisotropy to a modulus of a rubber by compounding a bio-derived nanomaterial such as a cellulose fiber into a tire member is known (for example, Patent Document 1).

PRIOR ART DOCUMENT

Patent Document

Patent Document 1: JP 5691463 B

SUMMARY OF THE INVENTION

Problem to be Solved by the Invention

It is considered that a rubber is strengthened by forming a network structure and that anisotropy becomes easy to be obtained in a fiber material. However, if a dispersed state of the fiber material in a rubber matrix is poor, the fiber materials aggregate, making it difficult to obtain anisotropy, and a sufficient reinforcing property with respect to the rubber matrix cannot be obtained, and therefore it is considered that breaking strength is also lowered. Moreover, a rubber composition comprising a conventional fiber material has a high elastic modulus, and currently, a market demand value cannot have been sufficiently met in ride comfort and vibration.

It is an object of the present invention to provide a rubber composition highly achieving both breaking strength and anisotropy.

Means to Solve the Problem

As a result of intensive studies, the present inventor has found that a rubber composition highly achieving both breaking strength and anisotropy can be obtained by compounding an inorganic fiber material and a coupling agent, and completed the present invention.

That is, the present invention relates to:

[1] A rubber composition comprising a rubber component, an inorganic fiber material, and a coupling agent,

[2] The rubber composition of [1] above, wherein a ratio of 100% modulus in a grain direction M100a to 100% modulus in a cross-grain direction M100b (M100a/M100b) is 1.10 or more,

[3] The rubber composition of [1] or [2] above, further comprising carbon black (preferably 1 to 100 parts by mass, more preferably 5 to 80 parts by mass based on 100 parts by mass of the rubber component),

[4] The rubber composition any one of [1] to [3] above, further comprising a plasticizer (preferably 1 to 90 parts by mass, more preferably 3 to 70 parts by mass based on 100 parts by mass of the rubber component),

[5] The rubber composition any one of [1] to [4] above, wherein the rubber component comprises an isoprene-based rubber (preferably 5% by mass or more, more preferably 10 to 90% by mass),

[6] The rubber composition of any one of [1] to [5] above, wherein the coupling agent is a silane coupling agent,

[7] The rubber composition of any one of [1] to [6] above, comprising 1 to 40 parts by mass of the coupling agent based on 100 parts by mass of the rubber component,

[8] The rubber composition of any one of [1] to [7] above, wherein the coupling agent is a silane coupling agent having a sulfide group,

[9] The rubber composition of any one of [1] to [8] above, further comprising carbon black (preferably 1 to 100 parts by mass, more preferably 5 to 80 parts by mass based on 100 parts by mass of the rubber component) having a cetyltrimethylammonium bromide adsorption specific surface area (CTAB) of 180 $m^2/g$ or less,

[10] The rubber composition of any one of [1] to [9] above, comprising 1 to 50 parts by mass of the inorganic fiber material based on 100 parts by mass of the rubber component, wherein an average diameter D of the inorganic fiber material is 1.0 to 2000 nm, an average length L thereof is 0.10 to 100 μm, and an aspect ratio L/D thereof is 2 to 1000,

[11] The rubber composition of any one of [1] to [10] above, wherein the inorganic fiber material is one or more inorganic fiber materials selected from the group consisting of a magnesium sulfate fiber, a calcium silicate fiber, a potassium titanate fiber, an aluminum borate fiber, and sepiolite,

[12] A tire internal member formed of the rubber composition of any one of [1] to [11] above,

[13] A tire comprising the tire internal member of [12] above,

[14] The tire of [13] above, wherein the tire is a tire for a passenger car.

Effects of the Invention

According to the present invention, a rubber composition highly achieving both breaking strength and anisotropy is provided by compounding an inorganic fiber material and a coupling agent. Moreover, the tire comprising the tire internal member formed of the rubber composition has improved ride comfort and steering stability with a good balance.

EMBODIMENT FOR CARRYING OUT THE INVENTION

Since the rubber composition of the present disclosure comprises a rubber component, an inorganic fiber material, and a coupling agent, it exhibits excellent breaking strength and anisotropy.

Although it is not intended to be bound by theory, the following can be considered as a mechanism by which the rubber composition of the present disclosure can exhibit excellent breaking strength and anisotropy.

By compounding an inorganic fiber material into the rubber composition, a modulus of the rubber can be given with anisotropy, but it is considered that the inorganic fiber material is less likely to be dispersed in the rubber component compared with a filler such as carbon black. Therefore, the entire rubber matrix cannot be reinforced, and it is considered that it is difficult to obtain sufficient breaking strength and anisotropy. Here, by compounding a coupling agent together with the inorganic fiber material, dispersibility of the inorganic fiber material in the rubber matrix is improved to reinforce the entire matrix, and it becomes possible to orient the inorganic fiber material in a uniform state, and therefore it is considered that anisotropy also becomes improved.

In the rubber composition (vulcanized rubber) of the present disclosure, the value of the ratio of 100% modulus in the grain direction M100a to 100% modulus in the cross-grain direction M100b as the index of anisotropy (M100a/M100b, may be herein referred to as the "modulus ratio") is 1.10 or more, more preferably 1.15 or more, further preferably 1.20 or more, from the viewpoint of an excellent anisotropy. On the other hand, an upper limit value of the ratio of the modulus is not particularly limited, but is usually 2.00 or less, and may be 1.80 or less, 1.60 or less, or 1.50 or less. By setting the ratio of the modulus to 1.10 or more, a supple response to the cross-grain direction of the inorganic fiber material oriented in a highly dispersed state with the coupling agent is realized, and rigidity in the grain direction is increased, allowing for improvement in responsiveness. Besides, in the present disclosure, the "grain direction" means a rolling direction when a sheet is formed by extrusion or shearing, while the "cross-grain direction" means a direction perpendicular to the grain direction.

Moreover, when the rubber composition is used as a tire, the grain direction of the inorganic fibers may be any of a circumferential direction, a radial direction, and a width direction of the tire, but it is preferably arranged along the tire circumferential direction from the viewpoint of improving ride comfort and steering stability with a good balance. By orienting the inorganic fibers in the tire circumferential direction, a supple response to an input (vibration) from a tire vertical direction during rolling is realized, and by increasing rigidity in the orientation direction (tire circumferential direction), responsiveness to the input during steering is improved. Therefore, it is considered that ride comfort and the steering stability are improved with a good balance.

A procedure for producing a tire including a production of the rubber composition that is one embodiment of the present disclosure will be described in detail below. However, the following descriptions are illustrative for explaining the present disclosure, and are not intended to limit the technical scope of the present invention to this description range only. Besides, in the present specification, a numerical range identified with "to" means to include the numerical values of both ends.

<Rubber Component>

Examples of the rubber component that can be used in the present disclosure include diene-based rubbers such as an isoprene-based rubber, a styrene-butadiene rubber (SBR), a butadiene rubber (BR), a styrene-isoprene-butadiene rubber (SIBR), a chloroprene rubber (CR), and an acrylonitrile-butadiene rubber (NBR); non-diene-based rubbers such as an ethylene-propylene-diene rubber (EPDM), a butyl rubber (IIR), and a halogenated butyl rubber (X-IIR), and the like. They may be used alone, or two or more thereof may be used in combination. The rubber component may be a rubber component comprising at least one selected from the group consisting of an isoprene-based rubber, a SBR, and a BR, may be a rubber component comprising an isoprene-based rubber, may be a rubber component comprising an isoprene-based rubber and a BR, may be a rubber component consisting only of an isoprene-based rubber and a BR, may be a rubber component comprising a BR, may be a rubber component comprising a BR and a SBR, may be a rubber component consisting only of a BR and a SBR, may be a rubber component comprising an isoprene-based rubber, a SBR, and a BR, or may be a rubber component consisting only of an isoprene-based rubber, a SBR, and a BR.

A content of the diene-based rubber in 100% by mass of the rubber component is preferably 60% by mass or more, more preferably 70% by mass or more, further preferably 80% by mass or more, particularly preferably 85% by mass or more. Moreover, it may be a rubber component consisting only of a diene-based rubber.

(Isoprene-Based Rubber)

As an isoprene-based rubber, for example, those common in the tire industry can be used, such as an isoprene rubber (IR) and a natural rubber. Examples of the natural rubber includes a non-modified natural rubber (NR), as well as a modified natural rubber such as an epoxidized natural rubber (ENR), a hydrogenated natural rubber (HNR), a deproteinized natural rubber (DPNR), an ultra pure natural rubber, and a grafted natural rubber, and the like. These isoprene-based rubbers may be used alone, or two or more thereof may be used in combination.

The NR is not particularly limited, and those common in the tire industry can be used, examples of which include, for example, SIR20, RSS #3, TSR20, and the like.

A content of the isoprene-based rubber when compounded in 100% by mass of the rubber component is preferably 5% by mass or more, more preferably 10% by mass or more, further preferably 20% by mass or more, particularly preferably 30% by mass or more, from the viewpoint of breaking strength. On the other hand, an upper limit of the isoprene-based rubber in the rubber component is, but not particularly limited to, preferably 90% by mass or less, more preferably 85% by mass or less, further preferably 80% by mass or less, particularly preferably 75% by mass or less.

(Sbr)

The SBR is not particularly limited, examples of which include, for example, a solution-polymerized SBR (S—SBR), an emulsion-polymerized SBR (E-SBR), modified SBRs (a modified S—SBR, a modified E-SBR) thereof, and the like. Among them, a S—SBR is preferable. Examples of the modified SBR include a SBR modified at its terminal and/or main chain, a modified SBR coupled with tin, a silicon compound, etc. (a modified SBR of condensate or having a branched structure, etc.), and the like. Moreover, as the SBR, there are oil-extended type SBRs, in which an extending oil is added to adjust flexibility, and non-oil-extended type SBRs, in which no extending oil is added, both of which can be used. Examples of the SBR include, for example, SBRs manufactured and sold by JSR Corporation, Asahi Kasei Chemicals Co., Ltd., Zeon Corporation, etc. These SBRs may be used alone, or two or more thereof may be used in combination.

A styrene content of the SBR is preferably 15% by mass or more, more preferably 18% by mass or more, further preferably 20% by mass or more, from the viewpoint of grip performance. Moreover, it is preferably 60% by mass or less, more preferably 55% by mass or less, further preferably 50% by mass or less, from the viewpoints of polymer dispersibility and fuel efficiency. Besides, in the present specification, the styrene content of the SBR is calculated by $^{1}$H-NMR measurement.

A content of the SBR when compounded in 100% by mass of the rubber component is preferably 5% by mass or more, more preferably 10% by mass or more, further preferably 15% by mass or more, particularly preferably 20% by mass or more, from the viewpoint of abrasion resistance. Moreover, an upper limit of the content of the SBR in the rubber component is, but not particularly limited to, preferably 90% by mass or less, more preferably 85% by mass or less, further preferably 80% by mass or less, particularly preferably 75% by mass or less.

(Br)

The BR is not particularly limited, and those common in the tire industry can be used such as, for example, a BR having a cis 1,4 bond content (cis content) of less than 50% (a low cis BR), a BR having a cis 1,4 bond content of 90% or more (a high cis BR), a rare-earth-based butadiene rubber synthesized using a rare-earth element-based catalyst (a rare-earth-based BR), a BR containing a syndiotactic polybutadiene crystal (a SPB-containing BR), and a modified BR (a high cis modified BR, a low cis modified BR). These BRs may be used alone, or two or more thereof may be used in combination.

The cis 1,4 bond content of the high cis BR is preferably 95% or more, more preferably 97% or more. When the high cis BR is compounded, low temperature characteristics and abrasion resistance can be improved. Examples of the high cis BR include, for example, high cis BRs manufactured and sold by Zeon Corporation, Ube Industries, Ltd., etc., JSR Corporation, etc. Examples of the rare-earth-based BR include, for example, rare-earth-based BRs manufactured and sold by LANXESS, etc.

Examples of the SPB-containing BR include those in which 1,2-syndiotactic polybutadiene crystal is chemically bonded with BR and dispersed, but not those in which the crystal is simply dispersed in the BR. Examples of the SPB-containing BR include, for example, SPB-containing BRs manufactured and sold by Ube Industries, Ltd., etc.

Examples of the modified BRs include those obtained by adding a tin compound after polymerizing 1,3-butadiene by a lithium initiator, and further those in which the terminal of the modified BR molecule has tin-carbon bond (a tin-modified BR), a butadiene rubber (a modified BR for silica) having a condensed alkoxysilane compound at its active terminal, and the like. Examples of such modified BRs include, for example, a tin-modified polymer manufactured by ZS Elastomer Co., Ltd., a S-modified polymer (modified for silica), and the like.

A content of the BR when compounded in 100% by mass of the rubber component is preferably 5% by mass or more, more preferably 10% by mass or more, further preferably 15% by mass or more, further preferably 20% by mass or more, particularly preferably 25% by mass or more, from the viewpoint of abrasion resistance. An upper limit of the content of the BR in the rubber component is, but not particularly limited to, preferably 90% by mass or less, more preferably 85% by mass or less, further preferably 80% by mass or less, particularly preferably 75% by mass or less.

<Inorganic Fiber Material>

The rubber composition according to the present disclosure comprises an inorganic fiber material. By giving anisotropy in addition to strength and rigidity with the inorganic fiber material oriented in the tire circumferential direction, a supple response to an input (vibration) from the tire vertical direction during rolling is realized, and by increasing rigidity in the orientation direction (tire circumferential direction), responsiveness to the input during steering is improved.

The inorganic fiber material that can be used in the present disclosure is not particularly limited, examples of which include, for example, a magnesium sulfate fiber, a calcium silicate fiber, a potassium titanate fiber, an aluminum borate fiber, sepiolite, a glass fiber, and the like. Among them, one or more inorganic fiber materials selected from the group consisting of a magnesium sulfate fiber, a calcium silicate fiber, a potassium titanate fiber, an aluminum borate fiber, and sepiolite are preferable, and a magnesium sulfate fiber is more preferable. The above-described inorganic fiber material may be used alone, or two or more thereof may be used in combination.

As the magnesium sulfate fiber, a basic magnesium sulfate fiber represented by $MgSO_4 \cdot 5Mg(OH)_2 \cdot 3H_2O$ is preferable. As the calcium silicate fiber, a calcium silicate fiber represented by $6CaO \cdot 6SiO_2 \cdot H_2O$ is preferable. As the potassium titanate fiber, a potassium titanate fiber represented by $K_2O \cdot 6TiO_2$ or $K_2O \cdot 8TiO_2$ is preferable. As the aluminum borate fiber, an aluminum borate fiber represented by $9Al_2O_3 \cdot 2B_2O_3$ is preferable. As sepiolite, sepiolite represented by $Mg_8Si_{12}O_{30}(OH)_4(H_2O)_4 \cdot 8H_2O$ is preferable.

As the inorganic fiber material, a commercially available material may be used, or a material produced by a known production method may be used. Specific examples of the inorganic fiber material include, for example, inorganic fiber materials manufactured and sold by Ube Material Industries, Ltd., Otsuka Chemical Co., Ltd., Shikoku Chemicals Corporation, Omi Mining Co., Ltd., etc.

A content of the inorganic fiber material based on 100 parts by mass of the rubber component is preferably 1.0 part by mass or more, more preferably 1.5 parts by mass or more, further preferably 2.0 parts by mass or more, particularly preferably 2.5 parts by mass or more, from the viewpoint of anisotropy of the rubber composition. Moreover, it is preferably 50 parts by mass or less, more preferably 45 parts by mass or less, further preferably 40 parts by mass or less, particularly preferably 30 parts by mass or less, from the viewpoint of breaking strength of the rubber composition.

An average diameter (also referred to as an average fiber diameter or an average width) D of the inorganic fiber material is preferably 1.0 nm or more, more preferably 2.0 nm or more, further preferably 3.0 nm or more, from the viewpoints of rigidity and processability of the rubber composition. Moreover, it is preferably 2000 nm or less, more preferably 1000 nm or less, further preferably 500 nm or less, particularly preferably 100 nm or less, from the viewpoints of rigidity and breaking strength of the rubber composition.

An average length (also referred to as an average fiber length) L of the inorganic fiber material is preferably 0.10 µm or more, more preferably 0.15 µm or more, further preferably 0.20 µm or more, particularly preferably 0.50 µm or more, from the viewpoint of anisotropy of the rubber composition. Moreover, it is preferably 100 µm or less, more preferably 80 µm or less, further preferably 60 µm or less, particularly preferably 40 µm or less, from the viewpoints of rigidity and breaking strength of the rubber composition.

Besides, in the present disclosure, the average diameter D and the average length L can be measured by image analysis of scanning electron micrographs, image analysis of transmission micrographs, analysis of X-ray scattering data, a pore electrical resistance method (Coulter principle), and the like.

An aspect ratio L/D of the inorganic fiber material is preferably 2 or more, more preferably 4 or more, further preferably 6 or more, particularly preferably 8 or more, from the viewpoint of anisotropy of the rubber composition.

Moreover, it is preferably 1000 or less, more preferably 500 or less, further preferably 250 or less, particularly preferably 100 or less, from the viewpoint of breaking strength of the rubber composition.

<Coupling Agent>

The rubber composition according to the present disclosure comprises a coupling agent. The inorganic fiber material is less likely to be dispersed in the rubber component compared with a filler such as carbon black, but dispersibility of the inorganic fiber material is improved by compounding a coupling agent, which also improves anisotropy.

The coupling agent that can be used in the present disclosure is not particularly limited, examples of which include a silane coupling agent that couples with silica and a rubber component, a carbon coupling agent that couples with carbon black and a rubber component, and the like.

(Silane Coupling Agent)

The silane coupling agent is not particularly limited, and a silane coupling agent conventionally used in combination with silica in the rubber industry can be used, examples of which include, for example, silane coupling to agents having mercapto groups described below; silane coupling agents having sulfide groups such as bis(3-triethoxysilylpropyl) disulfide and bis(3-triethoxysilylpropyl)tetrasulfide; silane coupling agents having vinyl gorups such as vinyltriethoxysilane and vinyltrimethoxysilane; silane coupling agents having amino groups such as 3-aminopropyltriethoxysilane, 3-aminopropyltrimethoxysilane, and 3-(2-aminoethyl)aminopropyltriethoxysilane; glycidoxy-based silane coupling agents such as γ-glycidoxypropyltriethoxysilane and γ-glycidoxypropyltrimethoxysilane; nitro-based silane coupling agents such as 3-nitropropyltrimethoxysilane and 3-nitropropyltriethoxysilane; chloro-based silane coupling agents such as 3-chloropropyltrimethoxysilane and 3-chloropropyltriethoxy, and the like. Among them, silane coupling agents having sulfide groups and/or silane coupling agents having mercapto groups are preferable, and silane coupling agents having sulfide groups are more preferable. These silane coupling agents may be used alone, or two or more thereof may be used in combination.

It is preferable that the silane coupling agent having a mercapto group is a compound represented by the following formula (1) and/or a compound comprising a bond unit A represented by the following formula (2) and a bond unit B represented by the following formula (3).

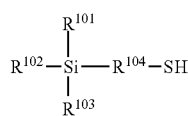

(1)

(wherein, $R^{101}$, $R^{102}$ and $R^{103}$ each independently represents a group represented by an alkyl having 1 to 12 carbon atoms, an alkoxy having 1 to 12 carbon atoms, or —O—$(R^{111}$—O$)_z$—$R^{112}$ ($R^{111}$s of z pieces each independently represents a divalent hydrocarbon group having 1 to 30 carbon atoms; $R^{112}$ represents an alkyl having 1 to 30 carbon atoms, an alkenyl having 2 to 30 carbon atoms, an aryl having 6 to 30 carbon atoms, or an aralkyl having 7 to 30 carbon atoms; and z represents an integer of 1 to 30); and $R^{104}$ represents an alkylene having 1 to 6 carbon atoms.)

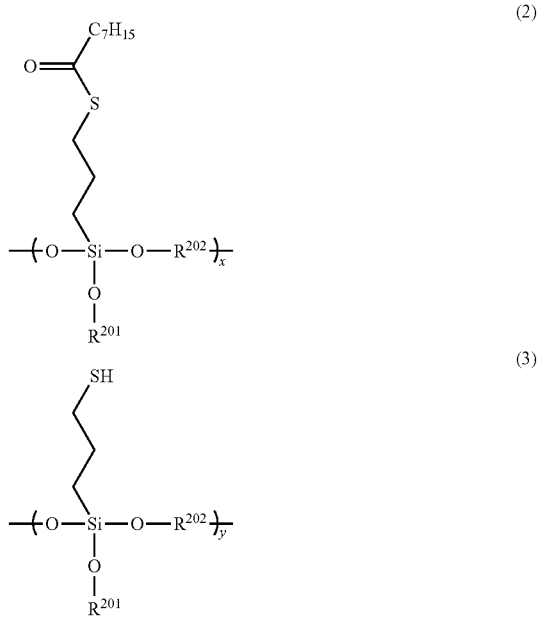

(wherein, x represents an integer of 0 or more; y represents an integer of 1 or more; $R^{201}$ represents hydrogen atom, or an alkyl having 1 to 30 carbon atoms, an alkenyl having 2 to 30 carbon atoms, or an alkynyl having 2 to 30 carbon atoms, each of the alkyl, the alkenyl and the alkynyl optionally being substituted with a halogen atom, hydroxyl, or carboxyl; and $R^{202}$ represents an alkylene having 1 to 30 carbon atoms, an alkenylene having 2 to 30 carbon atoms, or an alkynylene having 2 to 30 carbon atoms; and $R^{201}$ and $R^{202}$ may together form a ring structure.)

Examples of the compound represented by the chemical formula (1) include, for example, 3-mercaptopropyltrimethoxysilane, 3-mercaptopropyltriethoxysilane, 2-mercaptoethyltrimethoxysilane, 2-mercaptoethyltriethoxysilane, a compound represented by the following chemical formula (4) (Si363 manufactured by Evonik Degussa GmbH), and the like. Among them, the compound represented by the following chemical formula (4) can be appropriately used. They may be used alone, or two or more thereof may be used in combination.

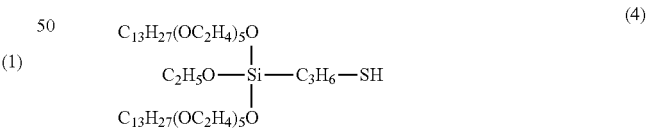

(4)

Examples of the compound comprising the bond unit A represented by the formula (2) and the bond unit B represented by the formula (3) include, for example, those manufactured and sold by Momentive Performance Materials, etc. They may be used alone, or two or more thereof may be used in combination.

(Carbon Coupling Agent)

The carbon coupling agent is not particularly limited, and examples thereof include tetrasulfide compounds such as bis(dimethylaminoethyl) tetrasulfide (DME) and bis(dimethylaminopropyl) tetrasulfide (DMP); benzimidazole-based compounds such as 1,2-bis(benzimidazolyl-2) ethane (EBZ) and 1,4'-bis(mercaptobenzimidazolyl-2) butane (C4SBZ); pyrithion metal salts, and the like. These carbon coupling agents may be used alone, or two or more thereof may be used in combination.

A content of the coupling agent (preferably silane coupling agent) based on 100 parts by mass of the rubber component is preferably 1.0 part by mass or more, more preferably 1.5 parts by mass or more, further preferably 2.0 parts by mass or more, from the viewpoint of enhancing dispersibility of the inorganic fiber material. Moreover, it is preferably 40 parts by mass or less, more preferably 30 parts by mass or less, further preferably 20 parts by mass or less, particularly preferably 15 parts by mass or less, from the viewpoint of breaking strength.

When a content of the inorganic fiber material based on 100 parts by mass of the rubber component is defined as A (part by mass), a content of silica based on 100 parts by mass of the rubber component is defined as B (part by mass), and a content of the coupling agent (preferably silane coupling agent) based on 100 parts by mass of the rubber component is defined as X (part by mass), A, B, and X satisfy the following inequality (5):

$$0.09A+0.08B \leq X \leq 0.35A+0.08B \quad (5)$$

<Filler>

In the above-described rubber composition, as a filler, those commonly used in the conventional rubber industry can be compounded, such as carbon black, silica, aluminum hydroxide, calcium carbonate, alumina, clay, and talc. Among them, the rubber composition preferably comprises carbon black, more preferably comprises carbon black and silica.

Since carbon black has high heat generation during mixing, it is considered that it promotes plasticization during mixing, and that the inorganic fiber material reacts with the coupling agent, allowing for carbon black to become easy to be dispersed in the rubber matrix. At the same time, unlike the inorganic fiber material, since carbon black can obtain a reinforcing effect without having anisotropy, the least breaking strength required can be imparted in the cross-grain direction of the inorganic fiber. On the other hand, although silica is inferior in reinforcing effect to carbon black and the inorganic fiber material, it can supplely exhibit a reinforcing effect, so that it is considered to be able to reinforce the entire rubber matrix while ensuring suppleness in the cross-grain direction.

(Carbon Black)

Carbon black is not particularly limited, and those common in the tire industry can be used such as GPF, FEF, HAF, ISAF, and SAF, and specifically, N110, N115, N120, N125, N134, N135, N219, N220, N231, N234, N293, N299, N326, N330, N339, N343, N347, N351, N356, N358, N375, N539, N550, N582, N630, N642, N650, N660, N683, N754, N762, N765, N772, N774, N787, N907, N908, N990, N991, and the like can be appropriately used, and in-house synthesized products and the like can also be appropriately used. These carbon black may be used alone, or two or more thereof may be used in combination.

A nitrogen adsorption specific surface area (N2SA) of carbon black is preferably 30 $m^2/g$ or more, more preferably 35 $m^2/g$ or more, further preferably 40 $m^2/g$ or more, from the viewpoints of weather resistance and reinforcing property. Moreover, it is preferably 250 $m^2/g$ or less, more preferably 220 $m^2/g$ or less, from the viewpoints of dispersibility, fuel efficiency, fracture characteristics, and durability. Besides, the N2SA of carbon black in the present specification is a value measured according to JIS K 6217-2: 2017 "Carbon black for rubber industry-Fundamental characteristics-Part 2: Determination of specific surface area-Nitrogen adsorption methods-Single-point procedures" A Method.

A cetyltrimethylammonium bromide adsorption specific surface area (CTAB) of carbon black is preferably 180 $m^2/g$ or less, more preferably 165 $m^2/g$, further preferably 150 $m^2/g$ or less, from the viewpoint of securing anisotropy of the rubber composition without excessively strengthening a rubber network. On the other hand, a lower limit value of the CTAB of carbon black is, but not particularly limited to, preferably 30 $m^2/g$ or more, more preferably 40 $m^2/g$ or more, further preferably 50 $m^2/g$ or more, from the viewpoint of reinforcing property. Here, the CTAB is a value that correlates with a particle size of carbon black, representing that the larger the CTAB is, the smaller the particle size of carbon black is. Besides, the CTAB of carbon black in the present specification is a value measured according to JIS K 6217-3: 2001 "Carbon black for rubber industry-Fundamental characteristics-Part 3: Determination of specific surface area-CTAB adsorption methods".

A content of carbon black when compounded based on 100 parts by mass of the rubber component is preferably 1 part by mass or more, more preferably 5 parts by mass or more, further preferably 10 parts by mass or more, particularly preferably 15 parts by mass or more, from the viewpoints of weather resistance and reinforcing property. Moreover, it is preferably 100 parts by mass or less, more preferably 80 parts by mass or less, further preferably 60 parts by mass or less, from the viewpoint of fuel efficiency.

(Silica)

Silica is not particularly limited, and those common in the tire industry can be used, such as, for example, silica prepared by a dry process (anhydrous silica) and silica prepared by a wet process (hydrous silica). Among them, hydrous silica prepared by a wet process is preferable from the reason that it has many silanol groups. These silica may be used alone, or two or more thereof may be used in combination.

A nitrogen adsorption specific surface area (N2SA) of silica is preferably 140 $m^2/g$ or more, more preferably 150 $m^2/g$ or more, further preferably 160 $m^2/g$ or more, particularly preferably 170 $m^2/g$ or more, from the viewpoints of fuel efficiency and abrasion resistance. Moreover, it is preferably 350 $m^2/g$ or less, more preferably 300 $m^2/g$ or less, further preferably 250 $m^2/g$ or less, from the viewpoints of fuel efficiency and processability. Besides, the N2SA of silica in the present specification is a value measured by a BET method according to ASTM D3037-93.

A content of silica when compounded based on 100 parts by mass of the rubber component is preferably 5 parts by mass or more, more preferably 10 parts by mass or more, further preferably 15 parts by mass or more, particularly preferably 20 parts by mass or more, from the viewpoint of fuel efficiency. Moreover, it is preferably 110 parts by mass or less, more preferably 100 parts by mass or less, further preferably 90 parts by mass or less, particularly preferably 80 parts by mass or less, from the viewpoint of processability.

A total content of silica and carbon black based on 100 parts by mass of the rubber component is preferably 20 parts by mass or more, more preferably 25 parts by mass or more, further preferably 30 parts by mass or more, particularly preferably 35 parts by mass or more, from the viewpoint of reinforcing property. Moreover, it is preferably 200 parts by mass or less, more preferably 170 parts by mass or less, further preferably 150 parts by mass or less, particularly preferably 130 parts by mass or less, from the viewpoint of processability.

A content of silica in the total content of silica and carbon black is preferably 50% or more, more preferably 70% or more, further preferably 80% or more.

A content of the inorganic fiber material in a total content of the inorganic fiber material, silica, and carbon black is preferably 5% by mass or more, more preferably 8% by mass or more. This makes it easier to obtain an anisotropy effect of the inorganic fiber material. On the other hand, the content of the inorganic fiber material in the total content of the inorganic fiber material, silica, and carbon black is preferably 30% by mass or less, more preferably 25% by mass or less, further preferably 20% by mass or less. This makes a rubber phase to be reinforced only in the grain direction, allowing for preventing strength from becoming extremely weak in the cross-grain direction.

(Other Compounding Agents)

The rubber composition can appropriately comprise compounding agents conventionally and generally used in the tire industry, for example, a plasticizer, wax, an antioxidant, stearic acid, zinc oxide, a vulcanizing agent such as sulfur, a vulcanization accelerator, and the like, in addition to the above-described components. Among them, it preferably comprises a plasticizer. By comprising a plasticizer, viscosity of a rubber is lowered at the time of mixing, making inorganic fiber materials easily dispersed, so that anisotropy and breaking strength tend to be improved. Examples of the plasticizer include, for example, oil, a resin component, a liquid rubber, and the like.

Examples of oil include, for example, mineral oils such as aromatic oils, process oils, and paraffin oils, and the like. Among them, it is preferable to use process oils because they reduce burden on the environment.

A content of oil when compounded based on 100 parts by mass of the rubber component is preferably 1 part by mass or more, more preferably 3 parts by mass or more, further preferably 5 parts by mass or more, particularly preferably 7 parts by mass or more, from the viewpoint of processability. Moreover, it is preferably 80 parts by mass or less, more preferably 70 parts by mass or less, further preferably 60 parts by mass or less, particularly preferably 50 parts by mass or less, from the viewpoint of abrasion resistance. Besides, in the present specification, the content of oil also includes an amount of oil contained in an oil-extended rubber.

The resin component is not particularly limited, examples of which include a petroleum resin, a terpene-based resin, a rosin-based resin, a phenol-based resin, and the like, which are commonly used in the tire industry. Examples of the petroleum resin include a C5-based petroleum resin, an aromatic-based petroleum resin, a C5-C9-based petroleum resin, and the like. These resin components may be used alone, or two or more thereof may be used in combination.

In the present specification, a "C5-based petroleum resin" refers to a resin obtained by polymerizing a C5 fraction. Examples of the C5 fraction include, for example, a petroleum fraction having 4 to 5 carbon atoms such as cyclopentadiene, pentene, pentadiene, and isoprene. As the C5-based petroleum resin, a dicyclopentadiene resin (DCPD resin) is appropriately used.

In the present specification, the "aromatic-based petroleum resin" refers to a resin obtained by polymerizing a C9 fraction, and may be hydrogenated or modified. Examples of the C9 fraction include, for example, a petroleum fraction corresponding to 8 to 10 carbon atoms such as vinyltoluene, alkylstyrene, indene, and methyl indene. As specific examples of the aromatic-based petroleum resin, for example, a coumarone indene resin, a coumarone resin, an indene resin, and an aromatic vinyl-based resin are appropriately used. As the aromatic vinyl-based resin, a homopolymer of α-methylstyrene or styrene or a copolymer of α-methylstyrene and styrene is preferable, and a copolymer of α-methylstyrene and styrene is more preferable, because it is economical, easy to process, and excellent in heat generation. As an aromatic vinyl-based resin, for example, those commercially available from Kraton Corporation, Eastman Chemical Company, etc. can be used.

In the present specification, the "C5-C9-based petroleum resin" refers to a resin obtained by copolymerizing the C5 fraction and the C9 fraction, and may be hydrogenated or modified. Examples of the C5 fraction and the C9 fraction include the above-described petroleum fractions. As a C5-C9-based petroleum resin, those commercially available from, for example, Tosoh Corporation, Zibo Luhua Hongjin New Material Co., Ltd., etc. can be appropriately used.

Examples of the terpene-based resin include a polyterpene resin consisting of at least one selected from terpene compounds such as α-pinene, β-pinene, limonene, and a dipentene; an aromatic-modified terpene resin made from the terpene compound and an aromatic compound; a terpene phenol resin made from a terpene compound and a phenol-based compound; and those in which these terpene-based resins are hydrogenated (hydrogenated terpene-based resins). Examples of the aromatic compound used as a raw material for the aromatic-modified terpene resin include, for example, styrene, α-methylstyrene, vinyltoluene, a divinyltoluene, and the like. Examples of the phenol-based compound used as a raw material for the terpene phenol resin include, for example, phenol, bisphenol A, cresol, xylenol, and the like.

Example of the rosin-based resin include, but not particularly limited to, for example, a natural resin rosin and a rosin-modified resin obtained by modifying it by hydrogenation, disproportionation, dimerization, esterification, or the like.

Examples of the phenol-based resin include, but not particularly limited to, a phenol formaldehyde resin, an alkylphenol formaldehyde resin, an alkylphenol acetylene resin, an oil-modified phenol formaldehyde resin, and the like.

A content of the resin component when compounded based on 100 parts by mass of the rubber component is preferably 1 part by mass or more, more preferably 3 parts by mass or more, further preferably 5 parts by mass or more. Moreover, the content of the resin component is preferably 50 parts by mass or less, more preferably 40 parts by mass or less, further preferably 20 parts by mass or less.

The liquid rubber is not particularly limited as long as it is a polymer in a liquid state at a normal temperature (25° C.), examples of which include, for example, a liquid butadiene rubber (a liquid BR), a liquid styrene-butadiene rubber (a liquid SBR), a liquid isoprene rubber (a liquid IR), a liquid styrene-isoprene rubber (a liquid SIR), a liquid farnesene rubber, and the like. These liquid rubbers may be used alone, or two or more thereof may be used in combination.

A content of the liquid rubber when compounded based on 100 parts by mass of the rubber component is preferably 1 part by mass or more, more preferably 3 parts by mass or more, further preferably 5 parts by mass or more. Moreover, the content of the liquid rubber is preferably 50 parts by mass or less, more preferably 40 parts by mass or less, further preferably 20 parts by mass or less.

A content of the plasticizer based on 100 parts by mass of the rubber component (a total amount of a plurality of plasticizer when used in combination) is preferably 1 part by mass or more, more preferably 3 parts by mass or more, further preferably 5 parts by mass or more, particularly preferably 7 parts by mass or more. Moreover, the content of the plasticizer is preferably 90 parts by mass or less, more preferably 70 parts by mass or less, further preferably 50 parts by mass or less, particularly preferably 30 parts by mass or less. When the content of the plasticizer exceeds 90 parts by mass, softening of the entire rubber matrix with the plasticizer is caused, and a sufficient reinforcing property with the inorganic fiber material cannot be obtained, and therefore, anisotropy and breaking strength tend to decrease.

A content of wax when compounded based on 100 parts by mass of the rubber component is preferably 0.5 parts by mass or more, more preferably 1.0 part by mass or more, further preferably 1.5 parts by mass or more, from the viewpoint of weather resistance of a rubber. Moreover, it is preferably 10 parts by mass or less, more preferably 5 parts by mass or less, from the viewpoint of preventing whitening of a tire due to bloom.

Examples of the antioxidant include, but not particularly limited to, for example, amine-based, quinoline-based, quinone-based, phenol-based, and imidazole-based compounds, and antioxidants such as a carbamic acid metal salt, preferably, phenylenediamine-based antioxidants such as N-(1,3-dimethylbutyl)-N'-phenyl-p-phenylenediamine, N-isopropyl-N'-phenyl-p-phenylenediamine, N,N'-diphenyl-p-phenylenediamine, N,N'-di-2-naphthyl-p-phenylenediamine, N-cyclohexyl-N'-phenyl-p-phenylenediamine, N,N'-bis(1-methylheptyl)-p-phenylenediamine, N,N'-bis(1,4-dimethylpentyl)-p-phenylenediamine, N,N'-bis(1-ethyl-3-methylpentyl)-p-phenylenediamine, N-4-methyl-2-pentyl-N'-phenyl-p-phenylenediamine, N,N'-diaryl-p-phenylenediamine, hindered diaryl-p-phenylenediamine, phenylhexyl-p-phenylenediamine, and phenyloctyl-p-phenylenediamine, and quinoline-based antioxidants such as 2,2,4-trimethyl-1,2-dihydroquinoline polymer and 6-ethoxy-2,2,4-trimethyl-1,2-dihydroquinoline. These antioxidants may be used alone, or two or more thereof may be used in combination.

A content of the antioxidant when compounded based on 100 parts by mass of the rubber component is preferably 0.5 parts by mass or more, more preferably 1.0 part by mass or more, further preferably 1.5 parts by mass or more, from the viewpoint of ozone crack resistance of a rubber. Moreover, it is preferably 10 parts by mass or less, more preferably 5 parts by mass or less, from the viewpoints of abrasion resistance and wet grip performance.

A content of stearic acid when compounded based on 100 parts by mass of the rubber component is preferably 0.5 parts by mass or more, more preferably 1.0 part by mass or more, further preferably 1.5 parts by mass or more, from the viewpoint of processability. Moreover, it is preferably 10 parts by mass or less, more preferably 5 parts by mass or less, from the viewpoint of vulcanization rate.

A content of zinc oxide when compounded based on 100 parts by mass of the rubber component is preferably 0.5 parts by mass or more, more preferably 1.0 part by mass or more, further preferably 1.5 parts by mass or more, from the viewpoint of processability. Moreover, it is preferably 10 parts by mass or less, more preferably 5 parts by mass or less, from the viewpoint of abrasion resistance.

Sulfur is appropriately used as a vulcanizing agent. As sulfur, a powdery sulfur, an oil processing sulfur, a precipitated sulfur, a colloidal sulfur, an insoluble sulfur, a highly dispersible sulfur, and the like can be used.

A content of sulfur when compounded as a vulcanizing agent based on 100 parts by mass of the rubber component is preferably 0.5 parts by mass or more, more preferably 1.0 part by mass or more, further preferably 1.5 part by mass or more, from the viewpoints of securing a sufficient vulcanization reaction and obtaining good grip performance and abrasion resistance. Moreover, it is preferably 5.0 parts by mass or less, more preferably 4.5 parts by mass or less, further preferably 4.0 parts by mass or less, from the viewpoint of preventing deterioration.

Examples of vulcanizing agents other than sulfur include, for example, vulcanizing agents comprising a sulfur atom such as TACKIROL V-200 manufactured by Taoka Chemical Co., Ltd., DURALINK HTS (sodium hexamethylene-1,6-bisthiosulfate dihydrate) manufactured by Flexsys, and KA9188 (1,6-bis(N,N'-dibenzylthiocarbamoyldithio)hexane) manufactured by LANXESS, organic peroxides such as dicumyl peroxide, and the like.

Examples of the vulcanization accelerator include, but not particularly limited to, for example, sulfenamide-based, thiazole-based, thiuram-based, thiourea-based, guanidine-based, dithiocarbamic acid-based, aldehyde-amine-based or aldehyde-ammonia-based, imidazoline-based, and xanthate-based vulcanization accelerators. Among them, sulfenamide-based vulcanization accelerators and guanidine-based vulcanization accelerators are preferable, and it is more preferable to use two of them in combination, from the viewpoint that desired effects can be obtained more appropriately.

Examples of the sulfenamide-based vulcanization accelerator include CBS (N-cyclohexyl-2-benzothiazolyl sulfenamide), TBBS (N-t-butyl-2-benzothiazolyl sulfenamide), N-oxyethylene-2-benzothiazolyl sulfenamide, N,N'-diisopropyl-2-benzothiazolyl sulfenamide, N,N-dicyclohexyl-2-benzothiazolyl sulfenamide, and the like. Examples of the thiazole-based vulcanization accelerator include 2-mercaptobenzothiazole, dibenzothiazolyl disulfide, and the like. Examples of the thiuram-based vulcanization accelerator include tetramethylthiuram monosulfide, tetramethylthiuram disulfide, tetrabenzylthiuram disulfide (TBzTD), and the like. Examples of the guanidine-based vulcanization accelerator include 1,3-diphenylguanidine (DPG), diorthotrilguanidine, orthotrilbiguanidine, and the like. These vulcanization accelerators may be used alone, or two or more thereof may be used in combination.

A content of the vulcanization accelerator when compounded based on 100 parts by mass of the rubber component is preferably 0.5 parts by mass or more, more preferably 1.0 part by mass or more, further preferably 1.5 parts by mass or more. Moreover, the content of the vulcanization accelerator based on 100 parts by mass of the rubber component is preferably 8 parts by mass or less, more preferably 7 parts by mass or less, further preferably 6 parts by mass or less. When the content of the vulcanization accelerator is within the above-described ranges, breaking strength and elongation tend to be secured.

[Rubber Composition and Method of Producing Tire]

The rubber composition of the present disclosure can be produced by a known method, for example, by a method of kneading components other than vulcanizing agents and vulcanization accelerators, of the above-described components, with a known kneading machine used in the general rubber industry such as a Banbury mixer, a kneader, and an open roll, then adding the vulcanizing agents and the vulcanization accelerators to the mixture to further knead them, and then vulcanizing them, and the like. For example, in the kneading step, kneading is performed at 80° C. to 170° C. for 1 to 30 minutes, and in the vulcanization step, vulcanization is performed at 130° C. to 190° C. for 3 to 20 minutes.

It is considered that the rubber composition of the present disclosure realizes a supple response to an input (vibration) from a tire vertical direction during rolling by orienting the inorganic fibers in the tire circumferential direction and improves in responsiveness to the input during steering by increasing rigidity in the orientation direction (tire circumferential direction). Therefore, it can be appropriately used for continuous members in the tire circumferential direction such as a cap tread, a base tread, a sidewall, a sidewall inner layer, an inner liner, a strip apex, a bead apex, a clinch apex, a bead reinforcement layer, an insulation, and an insert, and it is considered that the similar effect can be obtained in either case. Among them, it is appropriately used as a rubber composition for tire internal member such as a base tread, a sidewall inner layer, an inner liner, a strip apex, a bead apex, a bead reinforcing layer, an insulation, and an insert. When the rubber composition of the present disclosure is used as such a tire internal member, elasticity (responsiveness) of the tire in the rolling direction can be improved while maintaining cushioning property, so that it is considered that steering stability and ride comfort are improved.

Besides, in the present specification, the "internal member" is not limited to the above-described members, but shall refer to tire members other than members that form an outer surface when the tires are mounted on a rim and filled with air.

The tire of the present disclosure can be produced by a usual method using the above-described rubber composition. That is, an unvulcanized rubber composition, in which each of the above-described components is compounded as necessary with the rubber component, is extruded into a shape of a corresponding tire member to obtain a rubber composition in which inorganic fiber materials are oriented in a grain direction. Then, the above-described rubber composition is attached together with other tire members on a tire molding machine so that the inorganic fiber materials are oriented in a tire circumferential direction, and the mixture is molded by a usual method to form an unvulcanized tire, and this unvulcanized tire is heated and pressurized in a vulcanizing machine, thereby producing a tire. The tire of the present disclosure may be a pneumatic tire or a non-pneumatic tire. Moreover, it is appropriate for a racing tire, a tire for a passenger car, a tire for a large passenger car, a tire for a large SUV, or a tire for a motorcycle, and can be used as a summer tire, a winter tire, or a studless tire thereof.

EXAMPLE

Although the present disclosure will be described based on Examples, it is not limited to Examples.

Various chemicals used in Examples and Comparative examples are collectively shown below.

NR: TSR20
BR: Ubepol BR150B manufactured by Ube Industries, Ltd. (cis content: 97%)
SBR1: Tufdene 3830 manufactured by Asahi Kasei Corporation (unmodified S—SBR, styrene content: 32% by mass, oil-extended product comprising 37.5 parts by mass of oil based on 100 parts by mass of the rubber component)
SBR2: Asaprene 1205 manufactured by Asahi Kasei Corporation (unmodified S—SBR, styrene content: 25% by mass)
Carbon black: Show Black N220 manufactured by Cabot Japan K. K. (CTAB: 100 $m^2$/g, N2SA: 111 $m^2$/g)
Silica: Ultrasil (Registered Trademark) VN3 manufactured by Evonik Degussa GmbH (N2SA: 175 $m^2$/g)
Inorganic fiber material 1: MOS-HIGE manufactured by Ube Material Industries, Ltd. (basic magnesium sulfate fiber, average fiber diameter: 500-1000 nm, average fiber length: 8-30 μm)
Inorganic fiber material 2: Sepiolite (average fiber diameter: 5-30 nm, average fiber length: 0.2-2.0 μm)
Inorganic fiber material 3: Xonohige manufactured by Ube Material Industries, Ltd. (calcium silicate fiber, average fiber diameter: 100-500 nm, average fiber length: 1-5 μm)
Silane coupling agent: Si69 manufactured by Evonik Degussa GmbH (bis(3-triethoxysilylpropyl)tetrasulfide)
Oil: Process oil X-140 manufactured by ENEOS Corporation
Antioxidant: OZONONE 6C manufactured by Seiko Chemical Co., Ltd. (N-(1,3-dimethylbutyl)-N'-phenyl-p-phenylenediamine)
Stearic acid: Stearic acid "*CAMELLIA*" manufactured by NOF CORPORATION
Zinc oxide: Zinc oxide No. 1 manufactured by Mitsui Mining & Smelting Co., Ltd.
Wax: OZOACE 0355 manufactured by Nippon Seiro Co., Ltd.
Sulfur: Powdered sulfur manufactured by Tsurumi Chemical Industry Co., Ltd.
Vulcanization accelerator 1: SOXINOL CZ manufactured by Sumitomo Chemical Co., Ltd. (N-cyclohexyl-2-benzothiazolyl sulfeneamide)
Vulcanization accelerator 2: SOXINOL D manufactured by Sumitomo Chemical Co., Ltd. (1,3-diphenylguanidine)

(Examples and Comparative Examples)

In accordance with the compounding formulation shown in Tables 1 and 2, using a Banbury mixer manufactured by Kobe Steel, Ltd., materials other than sulfur and vulcanization accelerators were kneaded to obtain a kneaded product. Next, sulfur and vulcanization accelerators were added to the obtained kneaded product, and the mixture was kneaded using an open roll to obtain an unvulcanized rubber composition. From the obtained unvulcanized rubber composition, a sheet having a thickness of 0.5 mm was prepared with the open roll. The obtained unvulcanized rubber sheets were stacked to form a 1.5 mm sheet, which was press-vulcanized at 150° C. for 15 minutes to prepare a test vulcanized rubber sheet. Moreover, the above-described unvulcanized rubber composition was extruded into a shape of a sidewall inner layer with an extruder equipped with a mouthpiece having a predetermined shape to obtain a sidewall inner layer in which inorganic fiber materials were oriented in a grain direction. Then, the above-described sidewall inner layer was attached together with other tire members on the tire molding machine so that the inorganic fiber materials were oriented in the tire circumferential direction to form an unvulcanized tire, and this unvulcanized tire was press-vulcanized under a condition at 170° C. for 12 minutes to produce a tire (size: 205/65R15).

<Anisotropy Test>

The above-described vulcanized rubber sheet was punched in a grain direction (a roll rotation direction when producing an unvulcanized rubber sheet before vulcanization) with a JIS No. 3 dumbbell, and a tensile stress at 100% elongation (M100a) in the grain direction was measured under a condition of a tensile speed at 500 mm/min according to JIS K 6251: 2017. Similarly, the vulcanized rubber sheet was punched in a cross-grain direction (a direction perpendicular from the roll rotation direction when producing an unvulcanized rubber sheet before vulcanization) with the JIS No. 3 dumbbell, and a tensile stress at 100% elongation (M100b) in the cross-grain direction was measured under the condition of a tensile speed at 500 mm/min according to JIS K 6251: 2017. Then, modulus ratios (M100a/M100b) were calculated, which are described in Tables 1 and 2.

<Tensile Test>

Using a No. 3 dumbbell type test piece composed of a vulcanized rubber composition, elongation at break EB (%) and tensile strength TB (MPa) at break of the vulcanized rubber sheet were measured according to JIS K 6251: 2017. From the obtained value, breaking strength was calculated by the following equation and indicated as an index when the reference Comparative example (Comparative example 1 in Table 1, Comparative example 3 in Table 2, and the same applies hereinafter) was defined as 100 (breaking strength index). The results show that the larger the index is, the more excellent the breaking strength is.

$$\text{Breaking strength} = EB \times TB/2$$

<Evaluation on Steering Stability and Ride Comfort>

A prototype tire was incorporated into a standard rim (size=16×6.5J) and filled with air to set an internal pressure to 210 kPa. This tire was mounted to a car with a displacement of 2000 cc. This car was run on a test course having an asphalt road surface, and sensory evaluations on ride comfort and stability of control during steering (steering stability) were performed by a test driver. The evaluations were performed on a scale of 10 points, where relative evaluations were performed with the reference Comparative example being as 6.0 points. The results show that the higher the score is, the better the steering stability and ride comfort are.

TABLE 1

| | Example | | | | | | Comparative example | |
|---|---|---|---|---|---|---|---|---|
| | 1 | 2 | 3 | 4 | 5 | 6 | 1 | 2 |
| Compounding amount (part by mass) | | | | | | | | |
| NR | 50 | 50 | 50 | 50 | 50 | 50 | 50 | 50 |
| BR | 50 | 50 | 50 | 50 | 50 | 50 | 50 | 50 |
| SBR1 | — | — | — | — | — | — | — | — |
| SBR2 | — | — | — | — | — | — | — | — |
| Carbon black | 50 | 50 | 50 | 50 | 50 | 50 | 50 | 50 |
| Silica | — | — | — | — | — | — | — | — |
| Inorganic fiber material 1 | 10 | 3.0 | 5.0 | 20 | — | — | — | 10 |
| Inorganic fiber material 2 | — | — | — | — | 20 | — | — | — |
| Inorganic fiber material 3 | — | — | — | — | — | 20 | — | — |
| Silane coupling agent | 1.0 | 1.0 | 1.0 | 2.0 | 2.0 | 2.0 | — | — |
| Oil | 10 | 10 | 10 | 10 | 10 | 10 | 10 | 10 |
| Antioxidant | 1.5 | 1.5 | 1.5 | 1.5 | 1.5 | 1.5 | 1.5 | 1.5 |
| Stearic acid | 2.0 | 2.0 | 2.0 | 2.0 | 2.0 | 2.0 | 2.0 | 2.0 |
| Zinc oxide | 2.5 | 2.5 | 2.5 | 2.5 | 2.5 | 2.5 | 2.5 | 2.5 |
| Wax | 1.0 | 1.0 | 1.0 | 1.0 | 1.0 | 1.0 | 1.0 | 1.0 |
| Sulfur | 2.0 | 2.0 | 2.0 | 2.0 | 2.0 | 2.0 | 2.0 | 2.0 |
| Vulcanization accelerator 1 | 1.8 | 1.8 | 1.8 | 1.8 | 1.8 | 1.8 | 1.8 | 1.8 |
| Vulcanization accelerator 2 | 1.2 | 1.2 | 1.2 | 1.2 | 1.2 | 1.2 | 1.2 | 1.2 |
| Evaluation | | | | | | | | |
| M100a/M100b | 1.30 | 1.10 | 1.20 | 1.40 | 1.15 | 1.20 | 1.00 | 0.95 |
| Breaking strength | 110 | 100 | 105 | 115 | 110 | 110 | 100 | 90 |
| Steering stability | 7.5 | 6.5 | 7.0 | 8.0 | 6.5 | 7.0 | 6.0 | 6.5 |
| Ride comfort | 6.0 | 6.0 | 6.0 | 5.0 | 6.0 | 6.0 | 6.0 | 5.5 |

TABLE 2

| | Example | | | | | Comparative example | | |
|---|---|---|---|---|---|---|---|---|
| | 7 | 8 | 9 | 10 | 11 | 3 | 4 | 5 |
| Compounding amount (part by mass) | | | | | | | | |
| NR | 50 | — | 10 | 50 | 10 | 50 | — | 10 |
| BR | 50 | 30 | 20 | 50 | 20 | 50 | 30 | 20 |
| SBR1 | — | 96.25 | — | — | — | — | 96.25 | — |
| SBR2 | — | — | 70 | — | 70 | — | — | 70 |
| Carbon black | 50 | 50 | 50 | 50 | 30 | 50 | 50 | 50 |
| Silica | 50 | 70 | 70 | 50 | 70 | 50 | 70 | 70 |
| Inorganic fiber material 1 | 10 | 10 | 10 | 5.0 | 10 | — | — | — |
| Inorganic fiber material 2 | — | — | — | — | — | — | — | — |
| Inorganic fiber material 3 | — | — | — | — | — | — | — | — |
| Silane coupling agent | 5.0 | 7.0 | 7.0 | 5.0 | 5.0 | 5.0 | 7.0 | 7.0 |
| Oil | 20 | 20 | 20 | 20 | 20 | 20 | 20 | 20 |

TABLE 2-continued

|  | Example | | | | | Comparative example | | |
|---|---|---|---|---|---|---|---|---|
|  | 7 | 8 | 9 | 10 | 11 | 3 | 4 | 5 |
| Antioxidant | 1.5 | 1.5 | 1.5 | 1.5 | 1.5 | 1.5 | 1.5 | 1.5 |
| Stearic acid | 2.0 | 2.0 | 2.0 | 2.0 | 2.0 | 2.0 | 2.0 | 2.0 |
| Zinc oxide | 2.5 | 2.5 | 2.5 | 2.5 | 2.5 | 2.5 | 2.5 | 2.5 |
| Wax | 1.0 | 1.0 | 1.0 | 1.0 | 1.0 | 1.0 | 1.0 | 1.0 |
| Sulfur | 2.0 | 2.0 | 2.0 | 2.0 | 2.0 | 2.0 | 2.0 | 2.0 |
| Vulcanization accelerator 1 | 1.8 | 1.8 | 1.8 | 1.8 | 1.8 | 1.8 | 1.8 | 1.8 |
| Vulcanization accelerator 2 | 1.2 | 1.2 | 1.2 | 1.2 | 1.2 | 1.2 | 1.2 | 1.2 |
| Evaluation | | | | | | | | |
| M100a/M100b | 1.30 | 1.30 | 1.30 | 1.20 | 1.20 | 1.00 | 1.00 | 1.00 |
| Breaking strength | 105 | 114 | 109 | 100 | 105 | 100 | 109 | 105 |
| Steering stability | 7.0 | 8.0 | 9.0 | 6.5 | 9.0 | 6.0 | 7.0 | 8.0 |
| Ride comfort | 6.0 | 5.0 | 4.0 | 6.0 | 5.0 | 6.0 | 5.0 | 4.0 |

From the results in Tables 1 and 2, it can be found that the rubber composition of the present disclosure comprising an inorganic fiber material and a coupling agent can highly achieve both breaking strength and anisotropy. Moreover, it can be found that the tire of the present disclosure comprising the tire internal member formed of the rubber composition has improved ride comfort and steering stability with a good balance.

The invention claimed is:

1. A tire comprising a tire internal member formed of a rubber composition comprising
    a rubber component,
    an inorganic fiber material,
    a carbon black, and
    a coupling agent,
wherein the inorganic fiber material is one or more inorganic fiber materials selected from the group consisting of a magnesium sulfate fiber, a calcium silicate fiber, and an aluminum borate fiber, and wherein a grain direction of the inorganic fiber is arranged along a tire circumferential direction;
wherein the rubber composition comprises 1 to 40 parts by mass of the coupling agent based on 100 parts by mass of the rubber component, and
wherein a ratio of 100% modulus in a grain direction M100a to 100% modulus in a cross-grain direction M100b (M100a/M100b) is 1.10 or more.

2. The tire of claim 1, wherein the rubber composition further comprises a plasticizer.

3. The tire of claim 1, wherein the rubber component comprises an isoprene-based rubber.

4. The tire of claim 1, wherein the coupling agent is a silane coupling agent.

5. The tire of claim 1, wherein the coupling agent is a silane coupling agent having a sulfide group.

6. The tire of claim 1, wherein the rubber composition further comprises carbon black having a cetyltrimethylammonium bromide adsorption specific surface area (CTAB) of 180 m$^2$/g or less.

7. The tire of claim 1, wherein the rubber composition comprises 1 to 50 parts by mass of the inorganic fiber material based on 100 parts by mass of the rubber component, wherein an average diameter D of the inorganic fiber material is 1.0 to 2000 nm, an average length L thereof is 0.10 to 100 μm, and an aspect ratio L/D thereof is 2 to 1000.

8. The tire of claim 1, wherein the tire is a tire for a passenger car.

* * * * *